June 9, 1925.   C. A. BOWEN   1,541,682
LUBRICATING SYSTEM
Filed April 17, 1922   2 Sheets-Sheet 1

C. A. Bowen
INVENTOR
BY Victor J. Evans
ATTORNEY

WITNESS:
E. R. Ruppert.

June 9, 1925.
C. A. BOWEN
1,541,682
LUBRICATING SYSTEM
Filed April 17, 1922
2 Sheets-Sheet 2
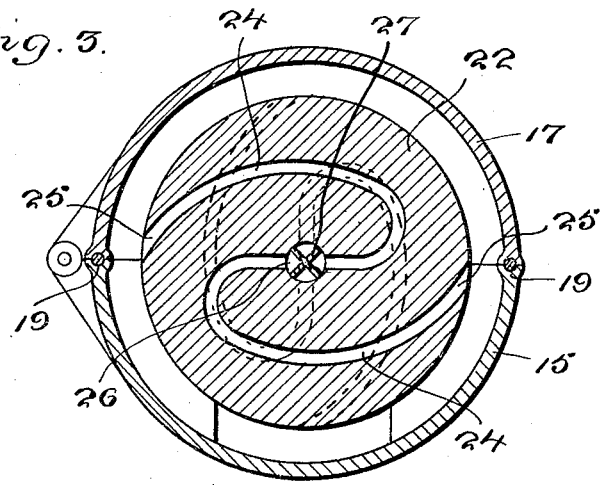
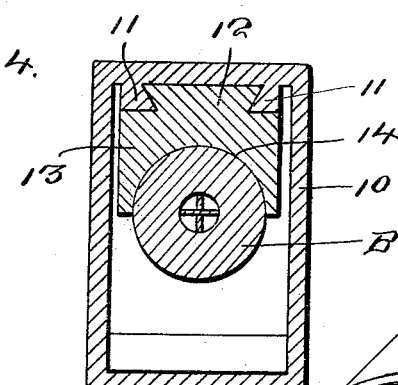
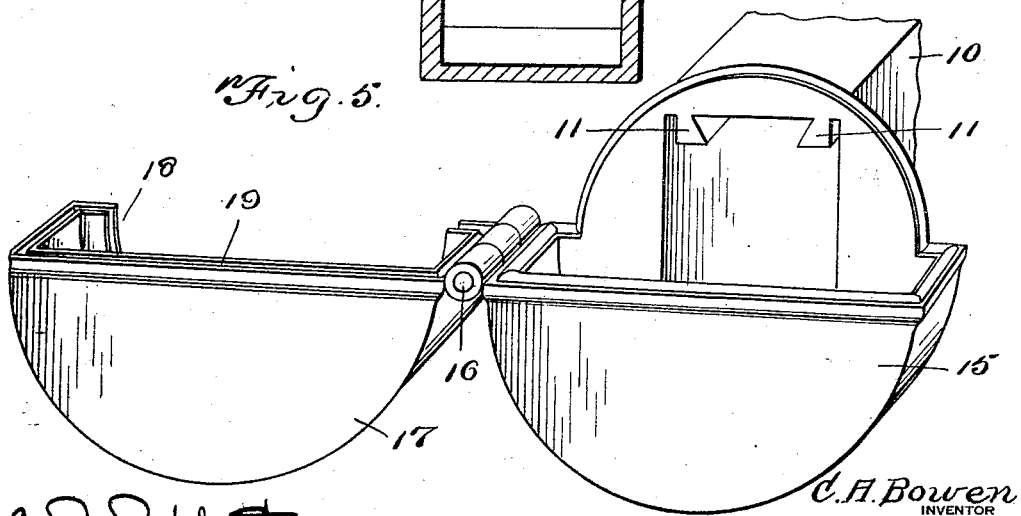

Patented June 9, 1925.

1,541,682

UNITED STATES PATENT OFFICE.

CHARLES A. BOWEN, OF PORTSMOUTH, OHIO.

LUBRICATING SYSTEM.

Application filed April 17, 1922. Serial No. 553,385.

*To all whom it may concern:*

Be it known that I, CHARLES A. BOWEN, a citizen of the United States, residing at Portsmouth, in the county of Scioto and State of Ohio, have invented new and useful Improvements in Lubricating Systems, of which the following is a specification.

This invention relates to railroad rolling stock particularly to the axles and axle mountings, and has for its object the provision of a novel construction whereby the axles will be thoroughly and continually lubricated so as to insure the maintenance of proper running condition, so that over heating will be prevented.

An important object is the provision of a structure of this character in which liquid lubricant is employed instead of the waste and grease used in the ordinary system of lubrication.

Another object is the provision of a structure of this character in which means is provided for forcibly feeding the oil to the contacting surfaces, the oil being returned to its reservoir for re-use, the action being furthermore positive regardless of the direction in which the wheels are rotating.

An additional object is the provision of a structure of this character which will be simple and inexpensive in manufacture and installation, highly efficient in use, positive in action, durable in service and a general improvement in the art.

Figure 1:
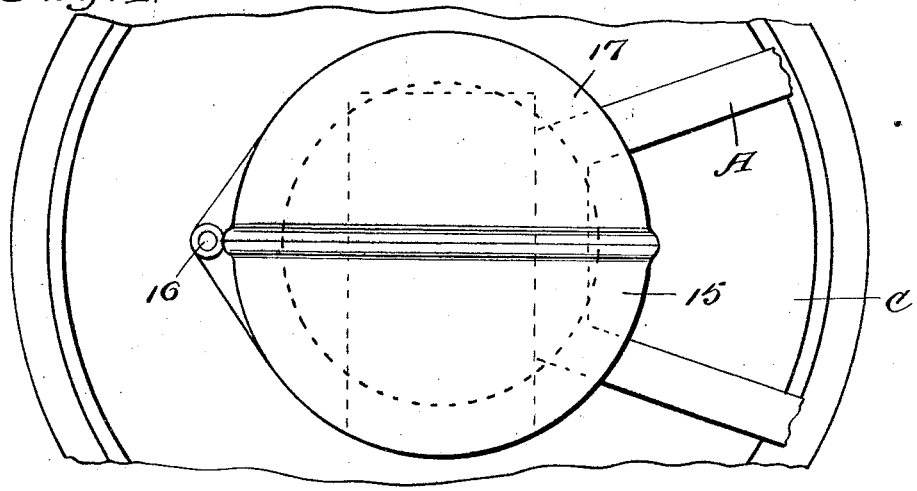
Figure 2:
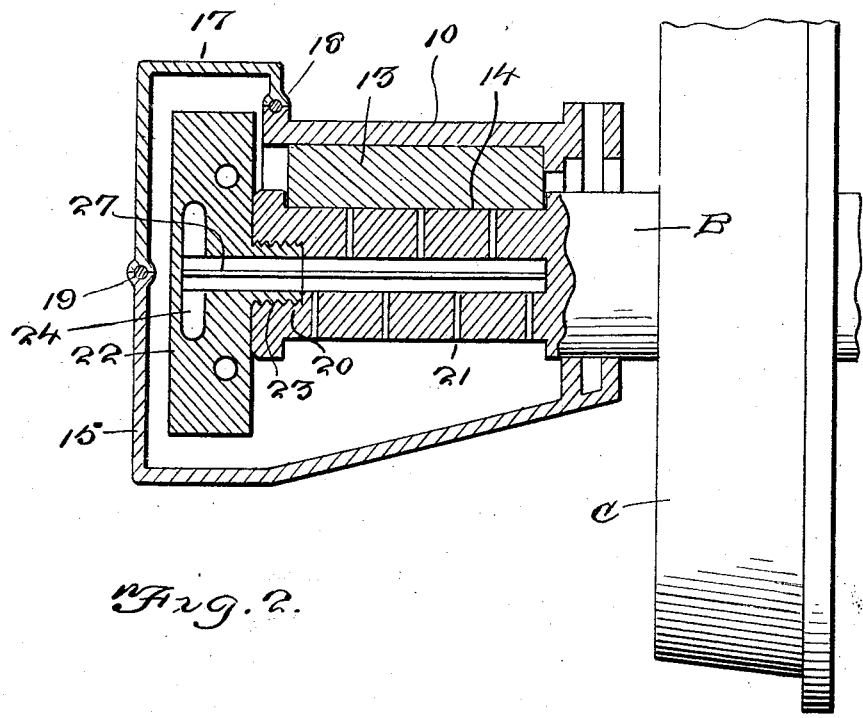

With the above and other objects and advantages in view, the invention consists in the details of construction to be hereinafter more fully described and claimed, and illustrated in the accompanying drawings, in which:

Figure 1 is a side elevation of a portion of a car truck having my journal box associated therewith, Figure 2 is a longitudinal section taken along the axle, Figure 3 is a vertical section at right angles to Figure 2 taken through the oil reservoir structure, Figure 4 is a detail cross section, Figure 5 is a perspective view of the journal member with the axle and other parts removed and with the cover swung into open position.

Referring more particularly to the drawings the letter A designates a portion of a car truck, B designates a car axle and C designates the wheels.

In carrying out my invention I provide a boxing 10 which is suitably supported and mounted within the truck and through which passes the axle B. This boxing is preferably rectangular in shape and has its front end open as shown. Formed on the underside of the top of the boxing are dove tailed ribs 11 with which is slidably engaged a dove tailed rib 12 formed on the upper surface of a bearing brass 13 which fits within the boxing in engagement with a stop lug or flange at the inner end thereof, the open outer end of the boxing permitting easy removal and insertion of the brass. The under surface of this brass is curved as shown at 14 for engagement by the axle B in the usual manner. The lubricating device includes a semi-cylindrical casing 15 formed or secured on the outer end of the boxing and constituting a reservoir for oil. Hinged at 16 upon one end of this reservoir casing is a cover 17 which has one edge cut away as shown at 18 for conforming engagement upon the outer end of the boxing. The meeting edges of the casing and cover are preferably formed with interfitting flanges 19 which may be packed if necessary to provide a liquid tight joint so that leakage of oil will be prevented.

The projecting end of the axle is drilled out to define an axial bore 20 into which lead a plurality of radial holes 21 which are arranged in spaced staggered relation and which may be of any desired size. Carried by the projecting end of the axle is a disk 22 which is provided at one side with a nipple 23 screwed into the bore 20. Formed within the disk 22 are oppositely arranged S-shaped passages 24 which have their outer ends leading to the periphery of the disk at openings 25. At the center of the disk these passages lead into separate compartments 26 formed in the nipple by right angularly arranged partitions 27, each half of each S-shaped passage leading into a separate compartment. The disk 22 dips into the reservoir casing as shown.

In the operation it will be seen that as the wheels rotate during the travel of the car over the tracks the disk 22 will be rotated within the oil reservoir. It will naturally follow that oil will enter the openings 25 and pass through the passages 24 into the respective compartments 26 in the nipple 23 and thence into the bore 20 and out through the holes 21 to the contacting surfaces so as to effectually lubricate them and keep then cool and prevent wear. It is apparent that when the wheels are turning in one direction one passage operates to take in oil and that when the wheels are turning in the other direction the other passage becomes active. Owing to the fact that certain of the parts are inclined downwardly and outwardly and owing to the fact that the interior of the cover 17 is curved it will be seen that the oil issuing from the holes 21 and passing over the contacting surfaces will run back to the reservoir casing 15 so as to be used over and over.

From the foregoing description and a study of the drawings it will be apparent that I have thus provided a simply constructed and consequently inexpensive lubricating device for the axles of car wheels, the structure being such that oil is used as the lubricating medium instead of the waste and so-called "dope" or grease as is the common practice in the ordinary type of journal box. Owing to the simplicity of the construction it is apparent that there is nothing to get out of order and that the device should have a long life and satisfactorily perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claims.

Having thus described my invention I claim:

1. In a car truck including an axle carrying a wheel, a journal box for the end of the axle including a casing having lower and upper sections, the lower sections constituting an oil reservoir and the upper section constituting a cover therefor, a bearing brass removably mounted within the journal box, means on the upper section of the box and on the axle for preventing longitudinal displacement of the bearing brass, a disk detachably mounted on the end of the axle and rotating within the box, the axle having a bore and the disk having a chamber communicating therewith, the axle having a plurality of staggered holes extending from the bore to the outer periphery, and passages in the disk extending from the periphery to the chamber, and a deflector cruciform in cross section mounted within said bore.

2. In a car truck including an axle carrying a wheel, a journal box for the end of the axle including a casing having lower and upper sections, the lower section constituting an oil reservoir and the upper section constituting a cover therefor, a bearing brass removably mounted within the journal box, means on the upper section of the box and on the axle for preventing longitudinal displacement of the bearing brass, a disk detachably mounted on the end of the axle and rotating within the box, the axle having a bore and the disk having a chamber communicating therewith, the axle having a plurality of staggered holes extending from the bore to the outer periphery, and passages in the disk extending from the periphery to the chamber, said passages being arranged in pairs and in series, the passages in each pair being oppositely arranged and one pair being arranged at a 90° angle from the other pair, and a pair of deflecting vanes located within said bore and arranged at right angles to each other.

3. In a car truck including axles carrying wheels, a journal box for each end of each axle including a casing constituting an oil reservoir, a cover for the casing, a bearing brass removably mounted within the journal box, a disk carried by the end of the axle and rotating within said reservoir casing, said disk being formed with curved passages leading to the center thereof, a hollow nipple leading from the center of the disk and communicating with the inner ends of said passages, the outer end of the axle being formed with a longitudinal bore receiving the nipple and further formed with holes leading from the bore to the periphery, the passages in the disk being of S-shape and oppositely arranged, and said nipple being provided interiorly with intersecting partitions defining separate compartments with which the inner ends of the passages communicate.

In testimony whereof I affix my signature.

CHARLES A. BOWEN.